US006608417B1

(12) United States Patent
Kozoriz

(10) Patent No.: US 6,608,417 B1
(45) Date of Patent: Aug. 19, 2003

(54) SUPER CONDUCTIVE BEARING

(75) Inventor: Vasyl' V. Kozoriz, Kiev (UA)

(73) Assignee: Global Trading & Technology, Inc., Columbus, OH (US)

( * ) Notice: Subject to any disclaimer, the term of this patent is extended or adjusted under 35 U.S.C. 154(b) by 275 days.

(21) Appl. No.: 09/654,964

(22) Filed: Sep. 5, 2000

(Under 37 CFR 1.47)

(51) Int. Cl.[7] ............................................... H02K 7/09
(52) U.S. Cl. ..................................................... 310/90.5
(58) Field of Search ............................ 310/90.5, 52–57

(56) References Cited

U.S. PATENT DOCUMENTS

| | | | | |
|---|---|---|---|---|
| 3,572,854 A | * | 3/1971 | Danby ........................ 310/90.5 |
| 3,650,581 A | * | 3/1972 | Boden et al. ............... 310/90.5 |
| 3,937,533 A | | 2/1976 | Veillette ....................... 308/10 |
| 3,958,842 A | | 5/1976 | Telle ............................ 308/10 |
| 4,058,746 A | * | 11/1977 | Mole et al. ................... 310/10 |
| 4,072,370 A | | 2/1978 | Wasson ......................... 308/10 |
| 4,886,778 A | | 12/1989 | Moon et al. .................... 505/1 |
| H900 H | * | 3/1991 | Griffin ......................... 505/166 |
| 5,177,387 A | * | 1/1993 | McMichael et al. ......... 310/90.5 |
| 5,235,454 A | * | 8/1993 | Iwasaki ....................... 359/198 |
| 5,256,637 A | | 10/1993 | Rao ............................... 505/1 |
| 5,332,987 A | | 7/1994 | Hennessy et al. ............ 335/216 |
| 5,517,071 A | | 5/1996 | Moon ......................... 310/90.5 |
| 5,565,763 A | | 10/1996 | Arrendale et al. ........... 323/360 |
| 5,986,373 A | | 11/1999 | Stucker ...................... 310/90.5 |
| 6,131,459 A | * | 10/2000 | Seale et al. .................... 73/633 |

OTHER PUBLICATIONS

"Handbook of Engineering Fundamentals" by Ovid W. Eshback, *John Wiley & Sons, Inc.* 2nd Edition, 1952, p. 9–74.

* cited by examiner

*Primary Examiner*—Dang Le
(74) *Attorney, Agent, or Firm*—Dwight A. Marshall

(57) ABSTRACT

A method and apparatus for supporting a rotor in a free state with respect to a stator with superconducting bearings. The apparatus has a rotor with closed rotor loops mounted on the rotor shaft and which are formed of a material having zero electrical resistance at a temperature below a superconductivity transition temperature. A stator encloses the rotor and has closed stator loops formed of the zero electrical resistance material and angularly positioned on the stator about the closed rotor loops. The closed rotor and stator loops are cooled to a temperature below the superconductivity transition temperature of the loop material and energized to create a magnetic flux between the ones of the closed rotor and stator loops. Apparatus for centering and securing the rotor within the stator is released to enable the rotor to move in the free state with respect to the stator.

20 Claims, 13 Drawing Sheets

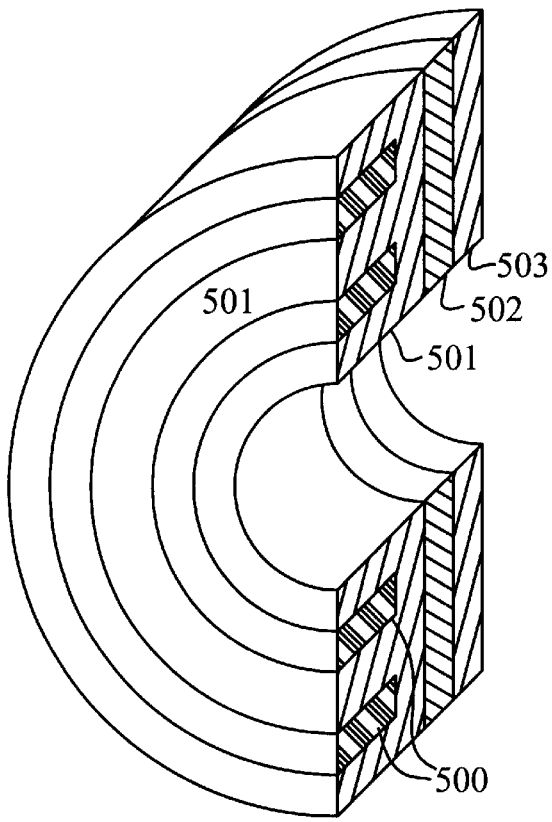
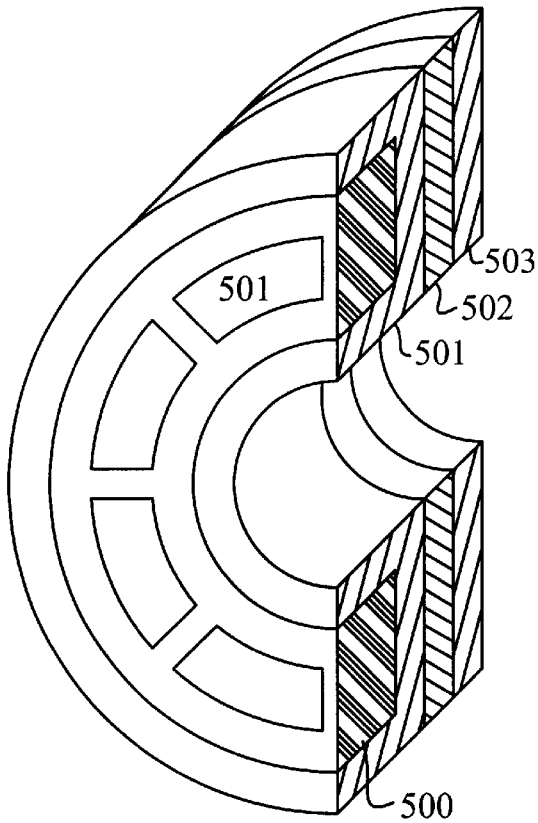
Fig. 11　　　　　Fig. 12
Fig. 13
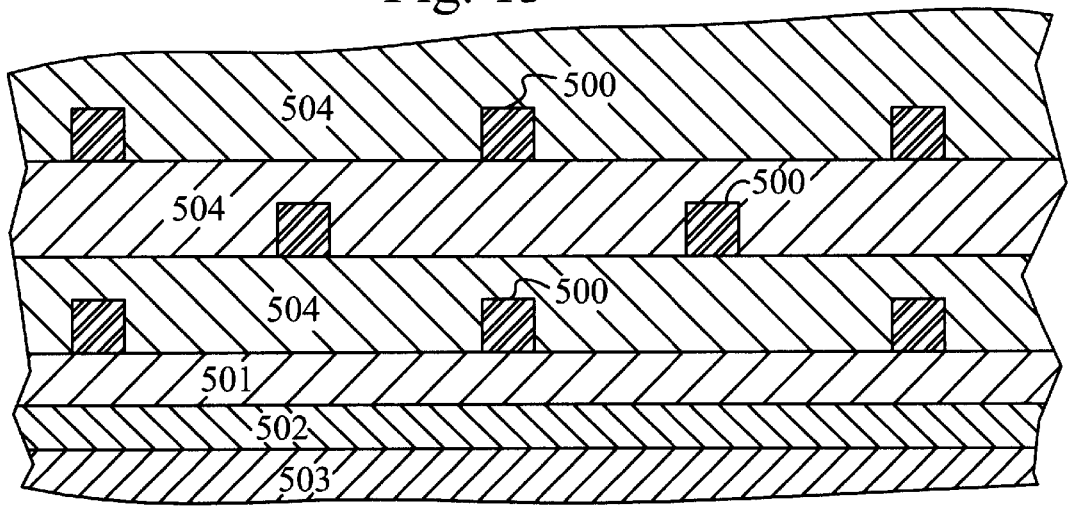

SUPER CONDUCTIVE BEARING

FIELD OF THE INVENTION

The invention relates to superconductive bearings and in particular to a method and apparatus of operating a structure of a rotor in an equilibrium stable state within a stator by use of superconductive bearings.

BACKGROUND OF THE INVENTION

Bearings have found a widespread use through-out time to enable movement of one mechanical part with respect to another. In one application, a bearing structure may enable movement of a wheel with respect to a axis in which a rotary part such as a wagon wheel rotates around a stationary part such as the wagon axle. In another application, rotating apparatus such as a rotor is positioned within stationary apparatus such as a stator like as in various types of electric motors so that the rotor rotates within the stator. In prior art bearing structures, the constant and long term rotation of a rotating part with respect to a stationary part causes an undue amount of wear on parts of the rotor and stator that are in movable contact with each other and thereby may result in an uneven movement of one part with another and even failure of the bearing structures.

Various techniques have been used to lessen and even prevent the wear of the moving parts. Even in very early times the wear problem was recognized and various types of lubricants have been applied as a thin film between the rotating parts to reduce friction, heat and wear. In addition, it was recognized that various types of materials could be developed and used with new lubricants to reduce the wear of the bearing parts and to improve operation of the bearing structures.

Attempts have also been made to suspend a moving part independently of a stationary part so as to prevent one part from engaging another and thereby reduce friction, wear and heat. Permanent magnets have been used in past bearing structures to generate opposing magnetic flux fields between a housing and an inner rotating member to repulse one moving part from another. In one such bearing structure, various configured iron rings were alternately mounted with axially magnetized rings on both a rotor and stator in which like poles on and between the rotor and stator face one and another to provide repulsion between the rotor and stator. A problem arises in this arrangement due to the unevenness in the fields generated by minor differences occurring in the ring configurations. One solution to prevent the minor differences from occurring was to install alternate iron rings and radially polarized magnets on both the rotor and stator. In another application, magnets were provided on a bearing rotor and a pair of coils were installed on a stator and pulsed to avoid a vibrational resonance condition between the stator and rotor. Another application, was to make a rotor operate independently of the stator by having one set of rings generating an axially aligned field and another set of rings generating a radially aligned field such that one member was suspended within another without contact. Again, problems exist in these designs due to the inconsistencies in the magnetized members.

Various bearing apparatus in the prior art have been designed to use superconducting material to improve operation of a rotor within fixed stators. In one design, a superconducting rotor is constructed with a magnetic pole at each end of the rotor with the poles resting in a bearing. A bath cools the apparatus such that the rotor is elevated with respect to the fixed bearing. Superconducting coils have been used with both rotor and stator apparatus to develop a repulsive force between the fixed stator and a movable rotor. Methods have been developed for charging superconductive coils constructed of niobiumtitanium and niobium-tin materials submerged in a cooling agent. Thermocouples, one located outside the cooling agent and another located in the cooling agent, are wired in series with the coil and serve to provide a current. One particular bearing structure has circular superconductive coils mounted within a disk of the rotor and has fixed superconductive coils mounted within the stator in a plane parallel to a plane of the rotor coils. The stator coils are positioned directly opposite the rotor coils and generate a repulsive force. Apparatus has also been developed to achieve a current circulating circuit in the winding of a superconducting magnet.

Although superconductive bearing apparatus has been developed in the prior art, a problem arises of instability of operation and super conductive bearing apparatus is needed to reduce magnetic field inhomogeneities which produce vibration between the stator and rotor in superconductive bearings.

SUMMARY OF THE INVENTION

It is an object of the invention for a superconductive magnetic bearing structure to support a rotor with respect to the stator in a free stable state.

It is another object of the invention for a superconductive bearing to have a rotor with closed rotor loops each formed of a superconductive material having zero electrical resistance at a temperature below a superconductivity transition temperature.

It is another object of the invention for a superconductive bearing to have closed stator loops formed of the superconductive material and angularly mounted on a stator around the closed rotor loops.

It is another object of the invention for a superconductive bearing to have a rotor with closed rotor loops each formed of a superconductive material having zero electrical resistance at a temperature below a superconductivity transition temperature and a stator enclosing the rotor and having closed stator loops formed of the superconductive material and angularly positioned around one of the closed rotor loops and cooled below the superconductivity transition temperature to establish frozen magnetic linkages between the closed rotor and stator closed loops to form the superconductive bearing supporting a rotation of the rotor in an equilibrium stable state within the stator.

It is another object of the invention for a superconductive bearing to have two-state switches each having resistive and shorting states for use with closed rotor and stator loops for enabling energization of the closed rotor and stator loops to establish frozen magnetic linkages therebetween.

In a preferred embodiment of the invention, apparatus for supporting a rotor with superconducting bearings in a stator has a rotor with a pair of closed rotor loops each formed of a planar short-circuited coil wound of a superconductive wire having zero electrical resistance at a temperature below a superconductivity transition temperature and which are mounted on a shaft of the rotor at each end of the rotor. A stator encloses the rotor and has closed stator loops formed as planar short-circuited coils wound of the superconductive wire and are configured to have two non-equal circular-arc sides joined at the ends thereof by radial segments and each is angularly positioned at ends of the stator around one of the closed rotor loops. A two-state switch having a resistive and a short state is formed of coils of wire wound around a section of the planar short-circuited coils of the closed stator loops. A cooling agent cools the closed rotor and stator closed loops to a temperature below the superconductivity transition temperature. Apparatus energizes the cooled closed rotor and stator loops and the two-state switch and establishes frozen magnetic linkages between the closed rotor and stator closed loops and forms a superconductive bearing supporting a rotation of the rotor in an equilibrium stable state within the stator. Sensors mounted on the stator within a magnetic field zone of the closed stator and rotor loops frozen magnetic linkages registers linear shifts and angular declinations of the rotor relative to the stator.

In another embodiment of the invention, a planar superconductive bearing structure has a rotatable member formed as a short-circuited coil wound of a superconductive wire having zero electrical resistance at a temperature below a superconductivity transition temperature. A plurality of stationary member closed loops are formed as a planar short-circuited coils wound of the superconductive wire configured to have two non-equal circular-arc sides joined at the ends thereof by radial segments are each angularly positioned around the closed rotatable member. A cooling agent cools the closed rotatable and stationary member closed loops to a temperature below the superconductivity transition temperature. Apparatus energizes the cooled rotatable and stationary member closed loops and establishes frozen magnetic linkages therebetween forming a superconductive bearing supporting a rotation of the rotatable member in an equilibrium stable state within the stationary members.

In another embodiment of the invention, a method of supporting a rotor within a stator by superconducting magnetic bearings comprises a step of arresting the rotor having closed rotor loops with respect to the stator having closed stator loops adjacent the closed rotor loops wherein the closed loops are formed of a superconductive material. The method cools the rotor and stator closed loops to a temperature below a superconductivity transition temperature and establishes a zero electric resistance of the closed loops. The method enables a small portion of the cooled rotor and the stator closed loops to assume a resistance state and applies a current through the resistance state of the cooled rotor and stator closed loops to generate frozen magnetic linkages between the rotor and stator closed loops. The rotor is then freed to rotate in an equilibrium stable state within the stator.

BRIEF DESCRIPTION OF THE DRAWING

For a further understanding of the objects and advantages of the present invention, reference should be had to the following detailed description, taken in conjunction with the accompanying drawing figures, in which like parts are given like reference numerals and wherein:

FIGS. 11 through 19 illustrates various constructions of closed rotor and stator loops in accordance with the principles of the invention.

DETAILED DESCRIPTION OF THE INVENTION

Figure 1:
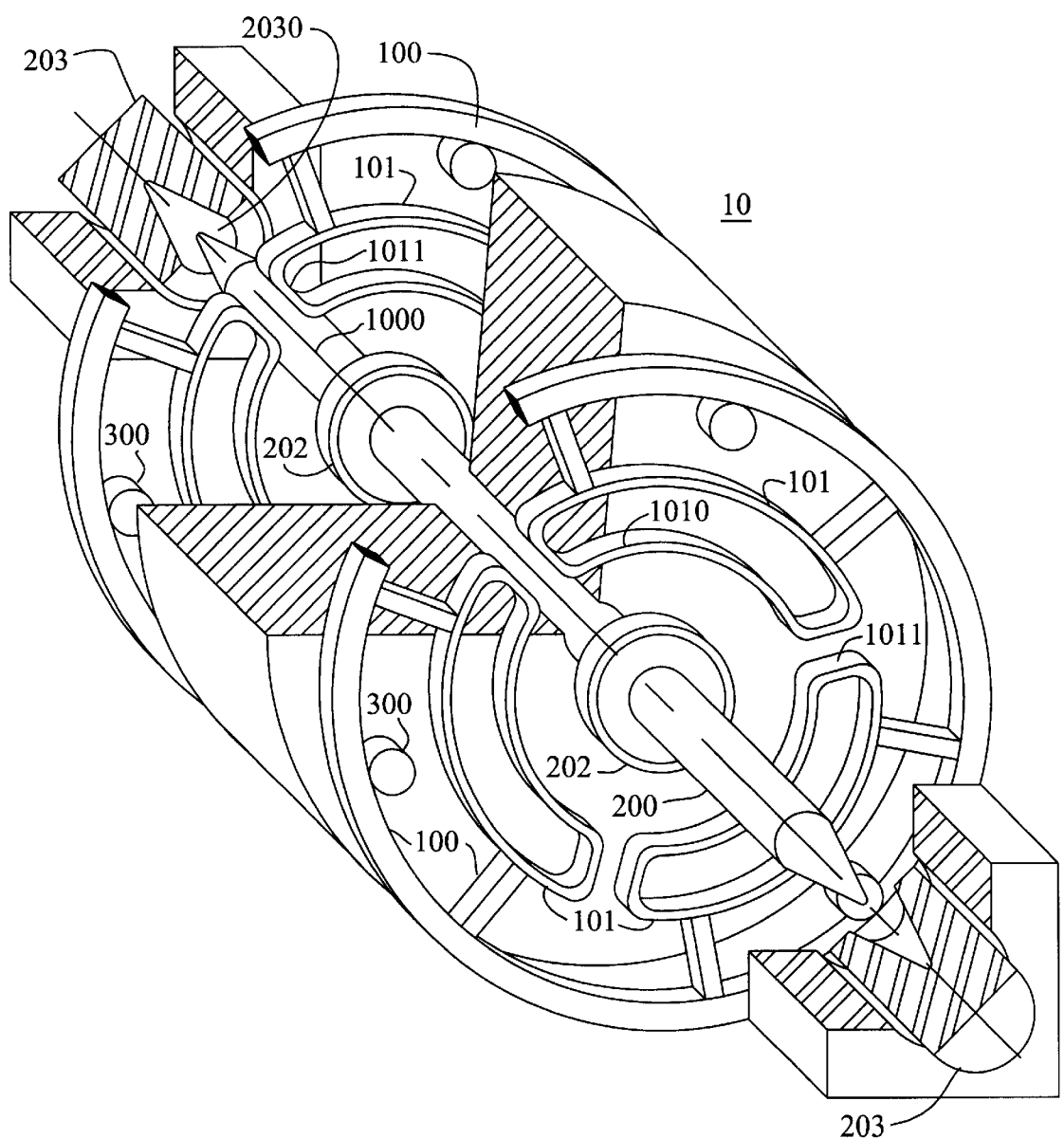
FIG. 1 is a view of one embodiment of bearing apparatus in accordance with the principles of the invention.

In a first exemplary embodiment of the invention, superconductive bearing apparatus 10, in accordance with the principles of the invention, is shown in FIG. 1 of the drawing. The bearing apparatus 10 set forth in FIG. 1 has two magnetic superconductive magnetic bearing structures rotatably supporting a rotor 200 in a free state within a stator 100. Each bearing structure consists of three closed stator loops 101 and one closed rotor loop 202 wherein the cross section of each loop is small compared to the area of the planer loop. The closed stator loops 101, although not limited thereto, may be planar superconductive short-circuited coils wound from thin niobium-titanium or niobium-tin wire or similar superconductive material and are angularly mounted at ends of the stator around the closed rotor loops 202. Each closed stator loop 101, although not limited thereto, is configured to have two non-equal circular arc sides 1010 joined at the ends thereof by radial segments 1011. Three closed stator loops 101 are mounted in a plane at each end of the stator and are positioned 120° apart around a closed rotor loop 202 to form one superconductive bearing. Each closed rotor loop 202 is a planar short-circuited coil wound from thin niobium-titanium or niobium-tin wire or is formed from a similar superconductive material of a superconductive wire and mounted on one end of the rotor 200.

In an initial state, the rotor 200 is prevented from rotation and is held in a fixed position with respect to stator 100 by arresting apparatus. Arresting apparatus may, in one embodiment of the invention, be a cylindrical member 203 having a conical aperture 2030 formed therein to receive a pointed end of rotor 200 and initially hold rotor 200 in a non-rotational and fixed position with regard to stator 100. Other types and configurations of arresting apparatus may be devised within the spirit and scope of the invention to hold and release rotor 200 with respect to stator 100. In operation, cylindrical members 203 located at and engaging each end of the rotor 200 are moved outward along axis 1000 of rotor 200 and away to disengage the conical apertures 2030 from the ends of rotor 200. Rotor 200, in a manner herein after described in detail, is thereby released to move in a free stable state with regard to stator 100.

Figure 2:
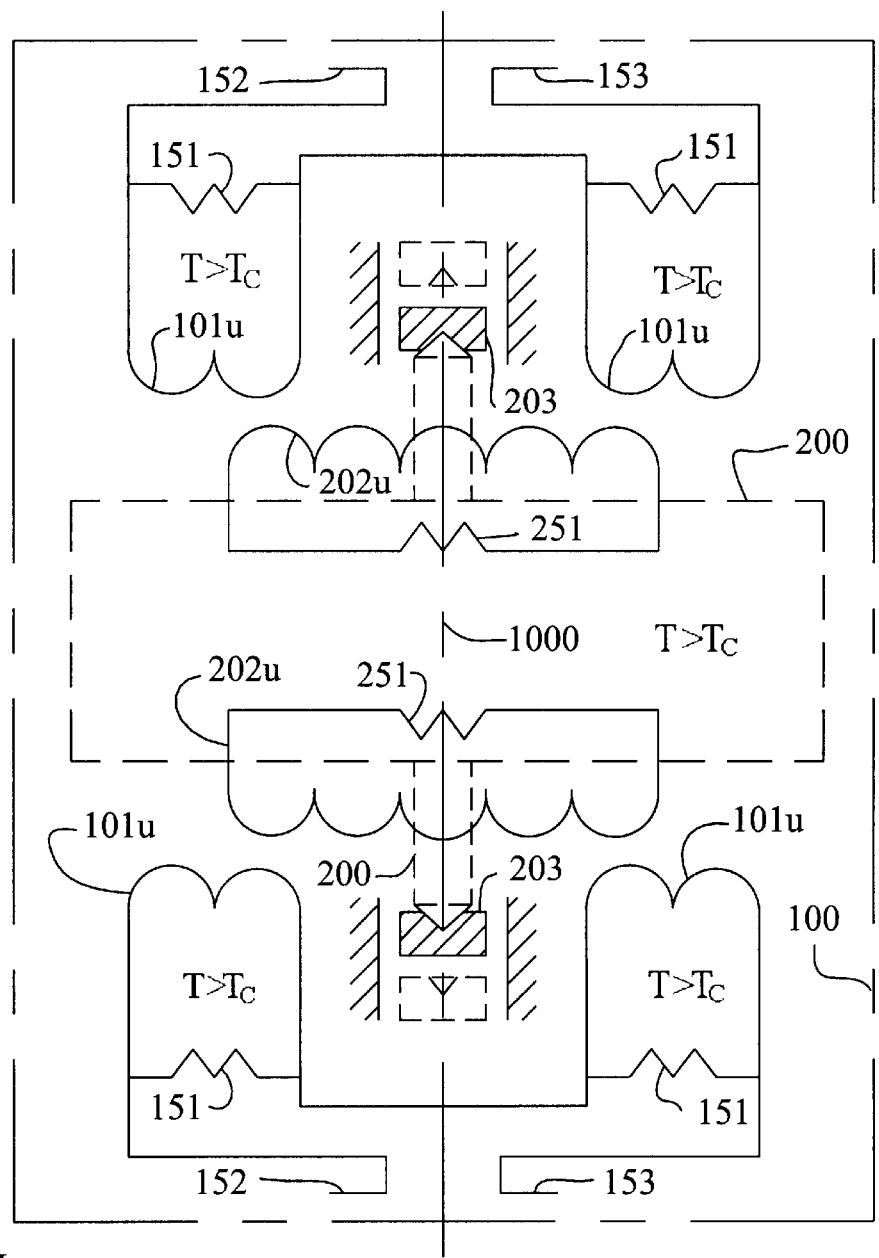
FIG. 2 illustrates a symbolic representation of the bearing apparatus at room temperature.

In order to prepare the bearing apparatus of FIG. 1 for operation, certain steps must be fulfilled. First rotor 200, FIG. 2, is held relative to stator 100 by the arrester members 203 gripping rotor 200 after movement along axis 1000 while the bearing apparatus components are at room temperature T. When the room temperature T is maintained above the superconductivity transition temperature $T_c$, the closed stator loops 101 are symbolically shown as coils 101u connected to current terminals 152 and 153 with a two state switch 151 shown as connected across ones of the coils 101u. Similarly, each of the two closed rotor loops 202 positioned at an end of the rotor 200 are each symbolically shown as coils 202u coupled with another two state switch 251. The two bearing structures are each represented by the combination of the closed stator loop coils 101u and two-state switch 151 with the closed rotor loop coils 202u and two-state switch 251 located at each end of the rotor 200. At room temperature T, the two-state switches 151 and 251 are represented in a resistance state.

The closed stator loops 101, FIG. 1, of each bearing structure may be connected in series as shown in FIG. 2 with outer ends of one of the closed stator loop coils 101u connected to current terminals 152 and 153. Thus, a current may be applied from a current source to one terminal 152 and, at room temperature T, flow through coils 101u of the three closed stator loops 101 and return to the source by the other terminal 153. In one embodiment of the invention, FIG. 3, although not necessarily limited thereto, two-state switch 151 may be constructed of a coil 1010u wound around part of a coil winding of ones of the closed stator loop coils 101u and will operate in a manner hereinafter described in detail to assume states herein represented as a resistance and a short, respectively.

Figure 4:
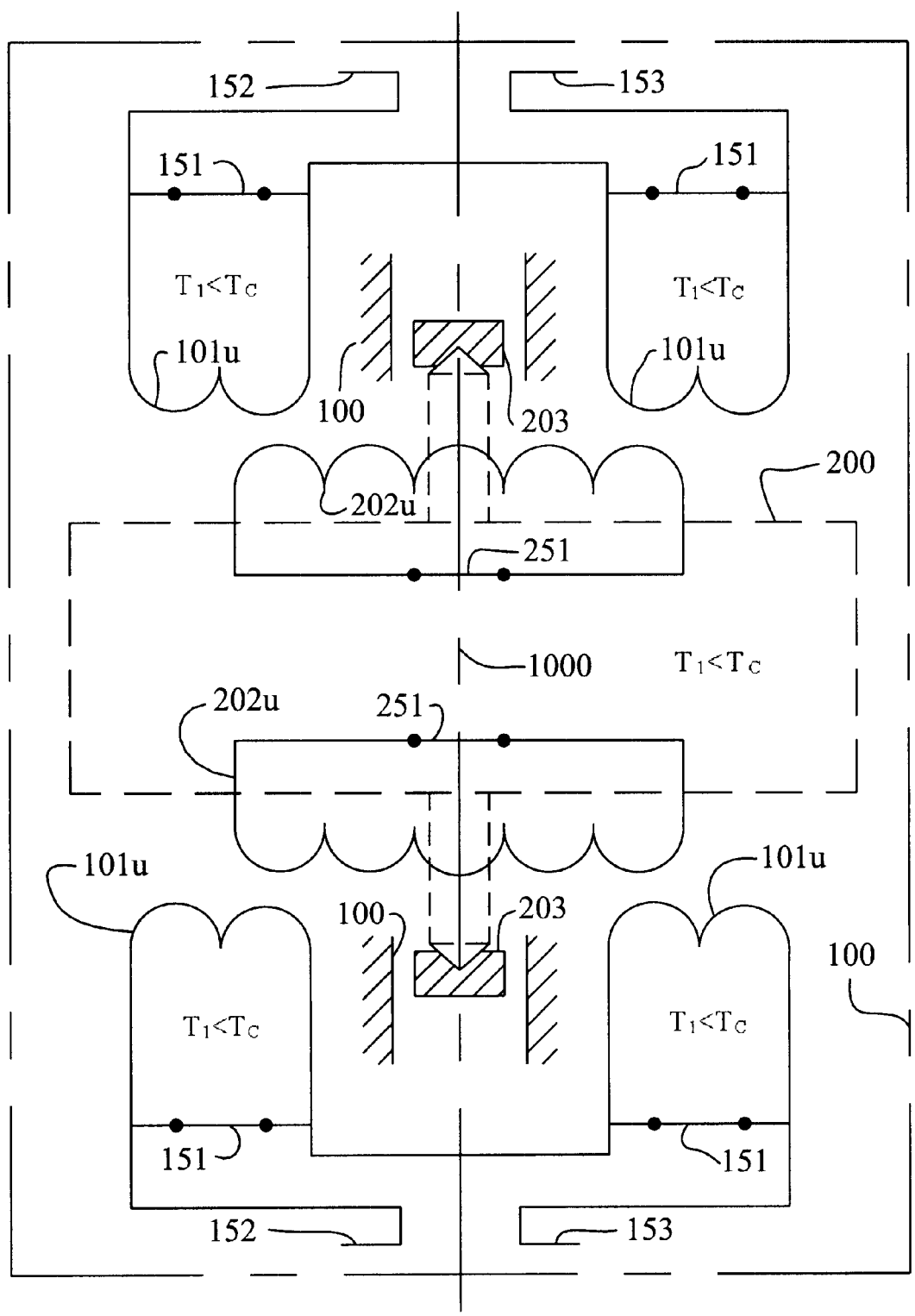
FIG. 4 illustrates the symbolic representation of the bearing apparatus in FIG. 2 at a temperature $T_1$ below a superconductivity transition temperature $T_c$.

With the rotor 200 held in a fixed positioned with respect to stator 100 by arresting members 203, FIG. 4, the bearing apparatus is cooled by a cooling agent to a temperature $T_1$ below the superconductivity transition temperature $T_c$ of the closed rotor and stator coil superconductor materials. With the superconductivity material of the closed stator and rotor loops, the resistance decreases as the temperature $T_1$ decreases and suddenly drops to essentially zero as temperature $T_1$ drops below the superconductivity transition temperature $T_c$. The electrical resistance of the closed rotor and stator loops 101, 202, FIG. 1, will remain at the zero value so long as the temperature condition $T_1$ is less than $T_c$ for all parts of the closed loops. Thus, when temperature $T_1$ of the bearing apparatus is below the superconductivity transition temperature $T_c$, the resistance of the closed rotor and stator loop coils 202u and 101u, FIG. 4 is essentially zero and two-state switches 151 of the stator 100 and 251 of the rotor 200 are shown as being in the short state.

Figure 3:
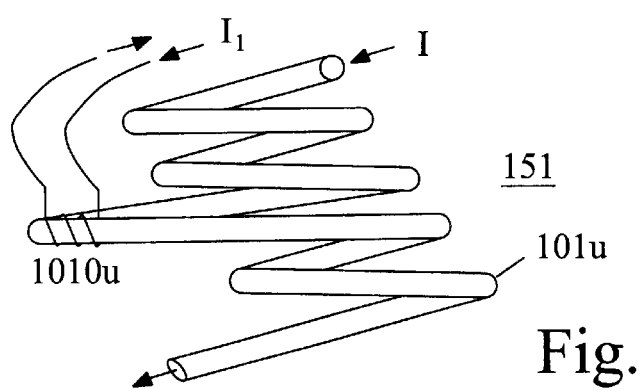
FIG. 3 illustrates a two-state switch used in accordance with the bearing apparatus set forth in FIG. 1 and the symbolic bearing apparatus representation of FIG. 2.
Figure 5:
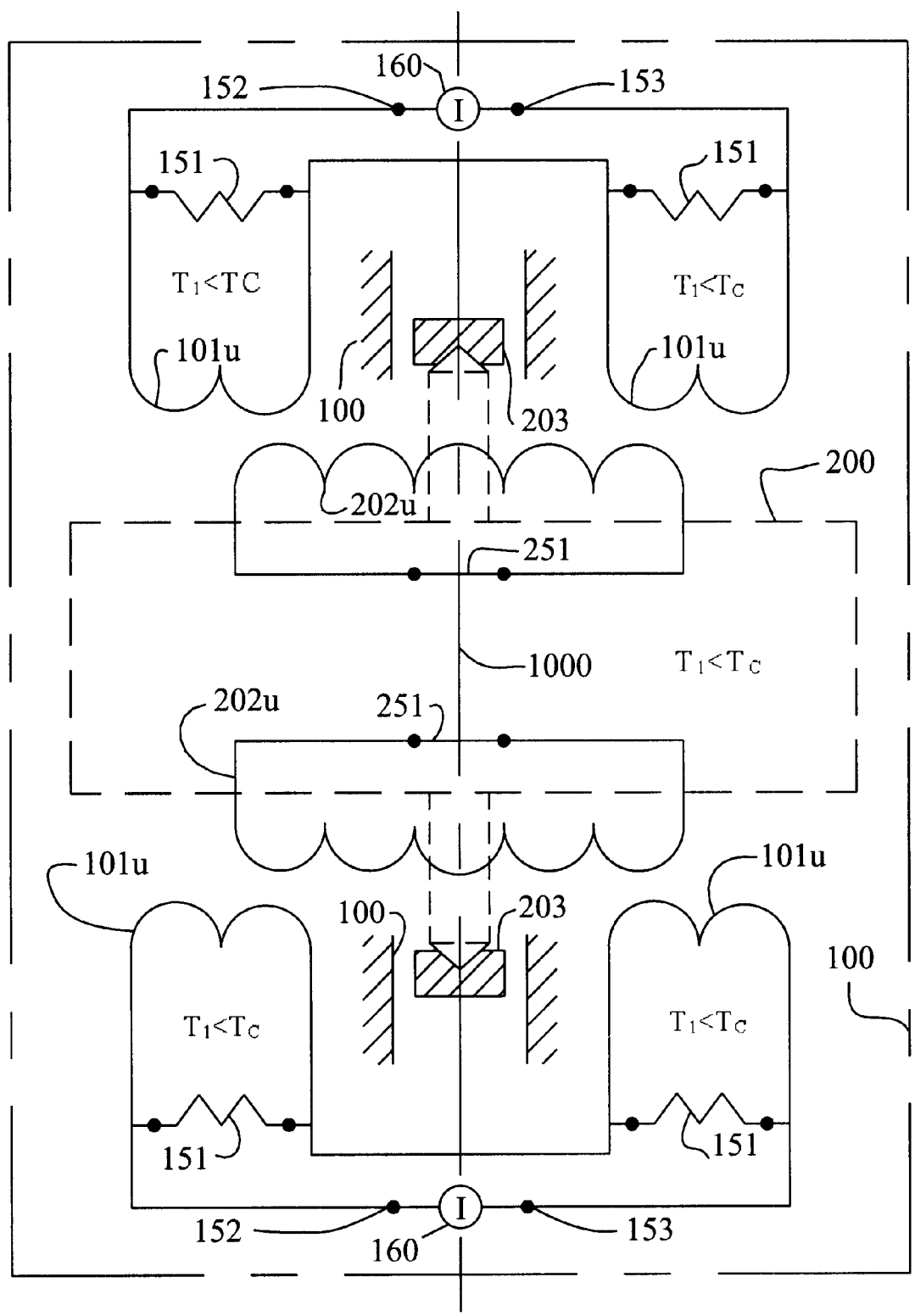
FIG. 5 illustrates the symbolic representation of the bearing apparatus in FIG. 2 with current applied to the closed stator loops.

As set forth in FIG. 3 of the drawing, a current $I_1$ is applied to the heating coil 1010u of two-state switch 151. The temperature of the section of coil winding 101u surrounded by heating coil 1010u rises above the superconductivity transition temperature $T_c$, FIG. 5, thereby causing the two-state switches 151 to assume the resistive state. Current I is then applied to the bearing apparatus via a current source 160 connected to the terminals 152 and 153 of the closed stator loops 101u while the temperature condition $T_1$ is less than $T_c$. In accordance with the superconductivity phenomenon, the superconductivity zero resistance of a small portion of the closed stator loops 101u are destroyed by the applied current I. Thus, a closed electrical circuit exists for the flow of an electric current. The applied current I and the flow of the applied current I in the closed stator loops 101u thereby generate a magnetic flux field between the adjacent closed stator and rotor coils 101u and 202u, respectively, attracting the closed rotor coils 202u to the closed stator coils 102u when the rotor coils 101u are positioned with respect to the stator coils 101u. The generated magnetic flux fields generate a current flow in the closed rotor loops 202u.

Figure 6:
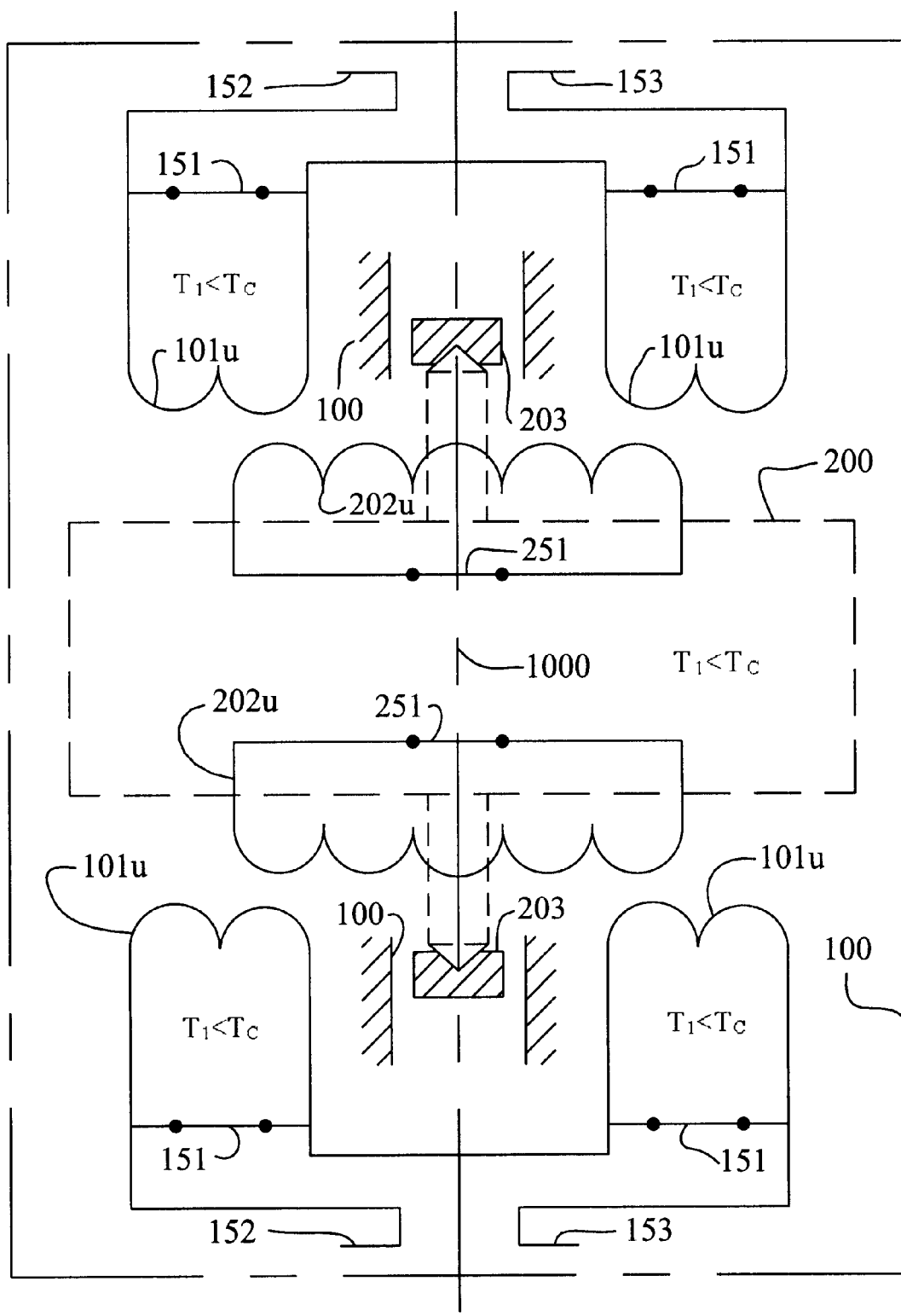
FIG. 6 illustrates the symbolic representation of the bearing apparatus in FIG. 2 with current removed from the closed stator loops and with two-state switches in the shorting states, respectively.

After achieving desirable energizing levels for the coils 101u of the closed stator loops 101, current $I_1$, FIG. 3, is removed from heating coils 1010u to discontinue the heating of the sections of closed stator loop coils 101u and the current I is removed from terminals 152 and 153, FIG. 6. Due to the cooling agent that is continuously cooling the bearing apparatus and the shut off of heating coils 1010u, the temperature $T_1$ is less than $T_c$ and the zero electrical conductivity state as a consequence is restored to the closed stator loop coils 101u. The condition of two-state-switches 151 and 251 corresponds to the short state and in accordance with the superconductivity phenomenon the current remains in the closed stator and rotor loops 101 and 202 and they begin to operate in a frozen magnetic linkage mode attracting one to the other without requiring any additional power.

Figure 7:
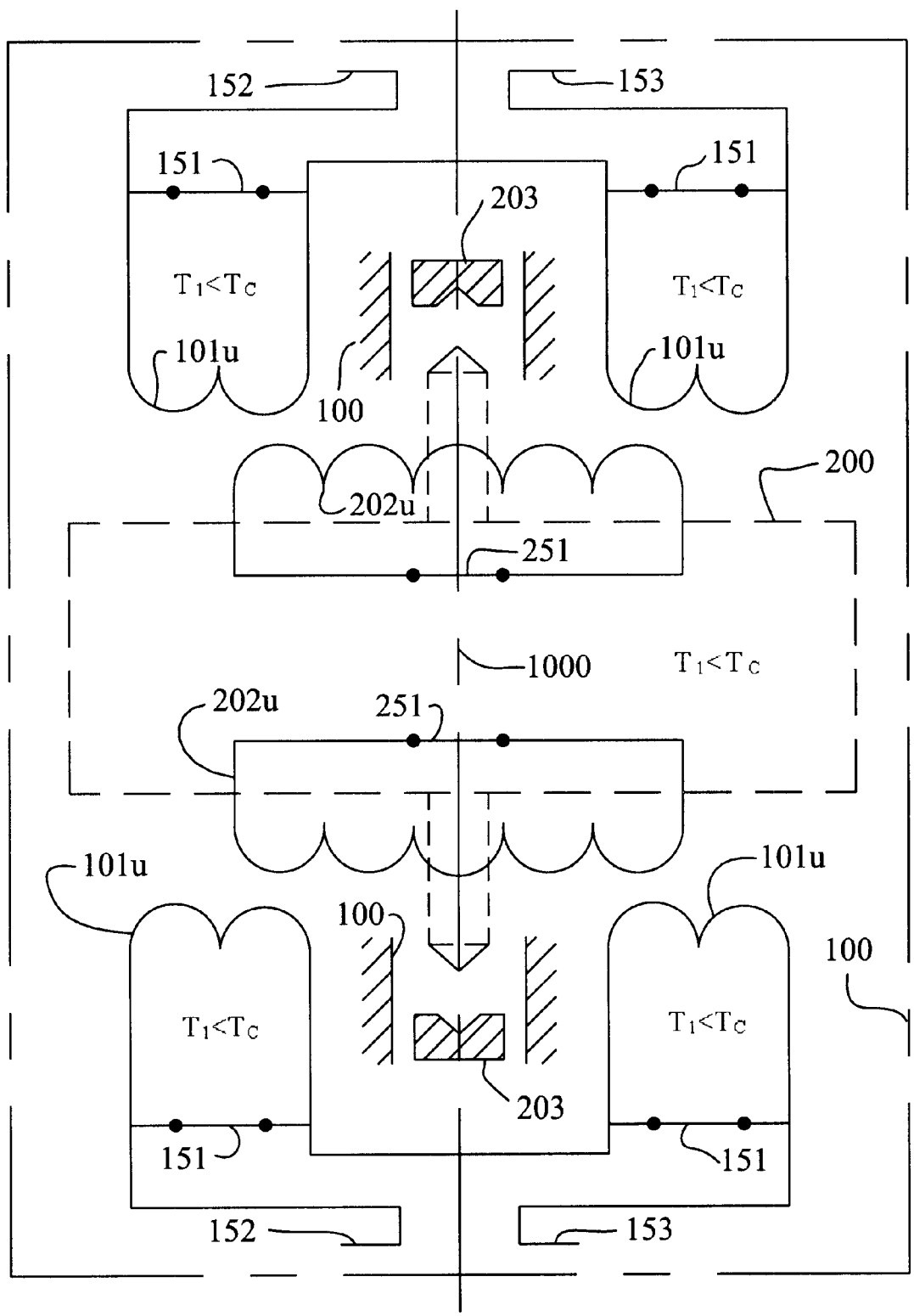
FIG. 7 illustrates the symbolic representation of the bearing apparatus in FIG. 2 with the rotor freed and with two-state switches in the shorting state and with the rotor positioned in an operational stable state with respect to the stator by frozen magnetic linkages established between the bearings closed stator and rotor loops.

Additional energizing of some of the closed stator loops may be required to provide for the fixed location of the rotor 200 after freeing, if needed. After that all of the closed stator and rotor loops 101 and 202 become short-circuited, FIG. 6, the superconductive coils 101u and 202u operate in the frozen magnetic linkage mode with non-zero and non-equal frozen magnetic linkage for any pair of magnetically interacting closed stator and rotor loop 101 and 202. After final energizing of the closed stator and rotor loops 101 and 202, FIG. 1, sensors 300 mounted on the stator 100 measure magnetic fields parameters at fixed location of the rotor 200. With the closed stator and rotor loops 101 and 202 linked by the frozen magnetic linkages of the stator and rotor coils 101u and 201u, FIG. 7, and the two-state switches 151 and 251 in the short state, the arrester members 203 are moved outward along rotor axis 1000 to free rotor shaft 200, FIG. 1, thereby enabling rotor 200 to rotate in a positional equilibrium stable state with respect to stator 100 within the superconductive bearing structures defined by the magnetically linked and closed stator and rotor loops 101 and 202.

After freeing the rotor 200, the sensors 300 register changes of magnetic field parameters and a measuring subsystem that may be connected with the stator sensors 300 determines linear shifts and angular inclinations of the rotor 200 at its free locations compared with its fixed location relative to stator 100. If these shifts and inclinations surpass acceptable shifts and inclinations, the above steps may be repeated beginning with moving the arrester members 203 along rotor axis 1000 to engage the rotor shaft 200. After the required limitations of shifts and inclinations of the rotor 200 in its free equilibrium location are satisfied, the free rotor 200 may be rotated at various speeds within its operation range. For each rotor speed, additional energizing can be made to limit shifts and declinations for the revolving rotor 200 to acceptable deviations.

Figure 8:
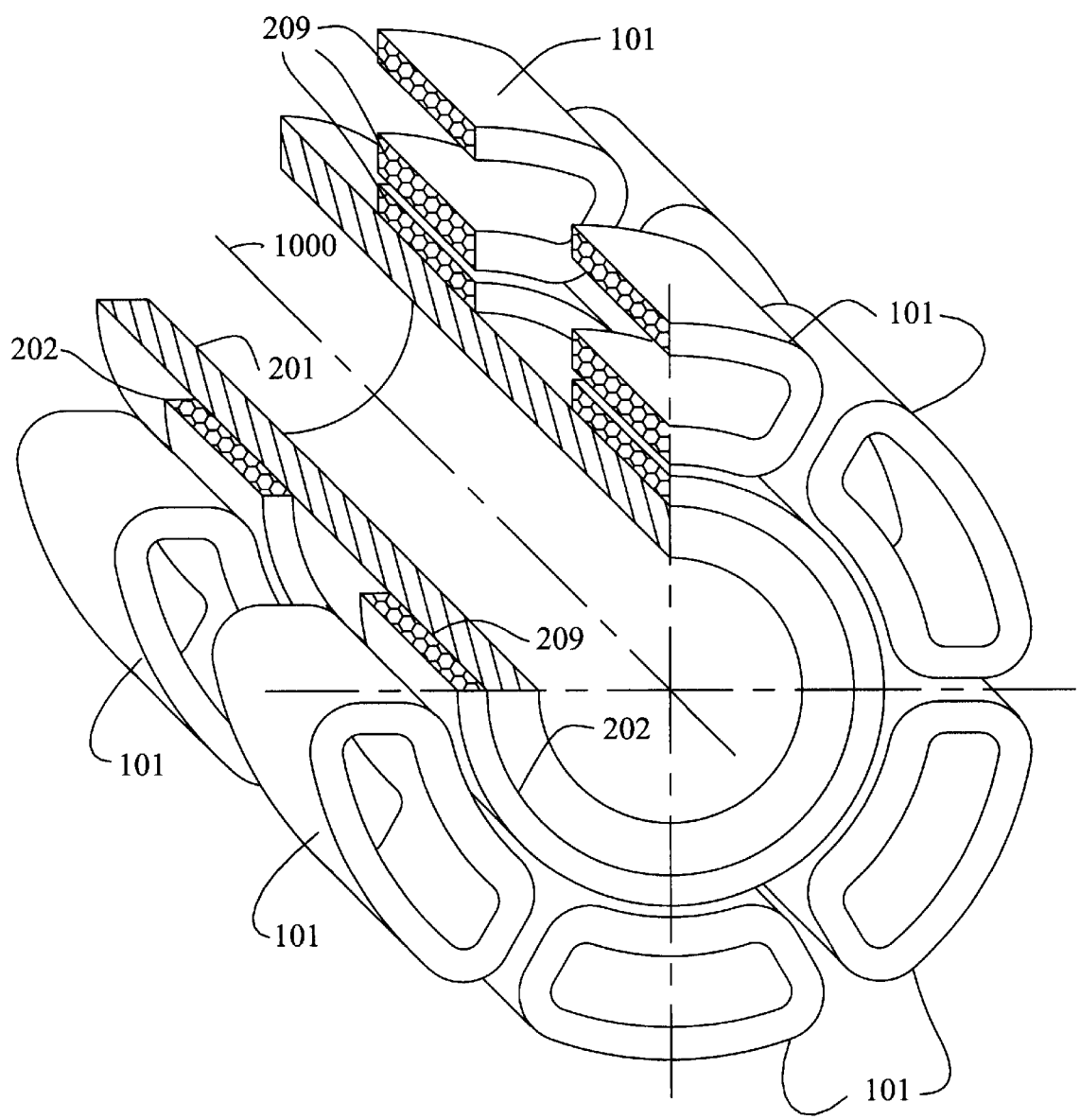
FIG. 8 is a view of another embodiment of bearing apparatus in accordance with the principles of the invention.

Another embodiment of the invention is shown in FIG. 8 of the drawing. The superconductivity bearing apparatus has a number of closed rotor loops 202 each wound as a coil of the superconductive wire or material around the rotor 201 and each positioned in a circular plane about the axis 1000 of the rotor 201 The stator 100 has a number of closed stator loops 101 each wound as a coil of superconductive wire 209 and ones of which are mounted in the stator 100 in a plane around the rotor adjacent to a corresponding one of the closed rotor loops 202. The closed stator loops 101 and rotor loops 202 are positioned in planes perpendicular to the rotor axis 1000 to form an axial plurality. Any pair of this plurality, or each superconductivity bearing, consists of six closed stator loops 101 and one closed rotor loop 202 positioned with the six closed stator loops 101 surrounding the one closed rotor loop 202. Each closed stator loop 101 is a planar superconductive short-circuited coil wound from a thin niobium-titanium or niobium-tin wire 209 or constructed from other super conductive material. Closed stator loops 101 are equipped with the two-state-switch, FIG. 3, and encased in a rigid member mounted on stator 100. The planar closed stator loop 101 is configured by two non-equal circular arcs and two radial segments connected by smooth curves. Six closed stator loops 101 are equally angularly spaced in a plane parallel to the rotor axis 1000 such that each of the six closed stator loops 101 are equally distant from the axis 1000. Each closed rotor loop 202 is a ring superconductive short-circuited coil wound from the thin niobium-titanium or niobium-tin wire 209, or other superconductive material, and equipped with the two-state-switch, and encased in a rigid member which is mounted around the rotor shaft 201. In the structure, each superconductivity bearing has six of the closed stator loops 101 angularly positioned around one closed rotor loop 202 and are located in the same plane with other superconductivity bearing planes equally spaced along the rotor 201. In order to establish the operating conditions for this superconductivity bearing apparatus, the steps as earlier set forth for FIGS. 2 through 7 are required.

Figure 9:
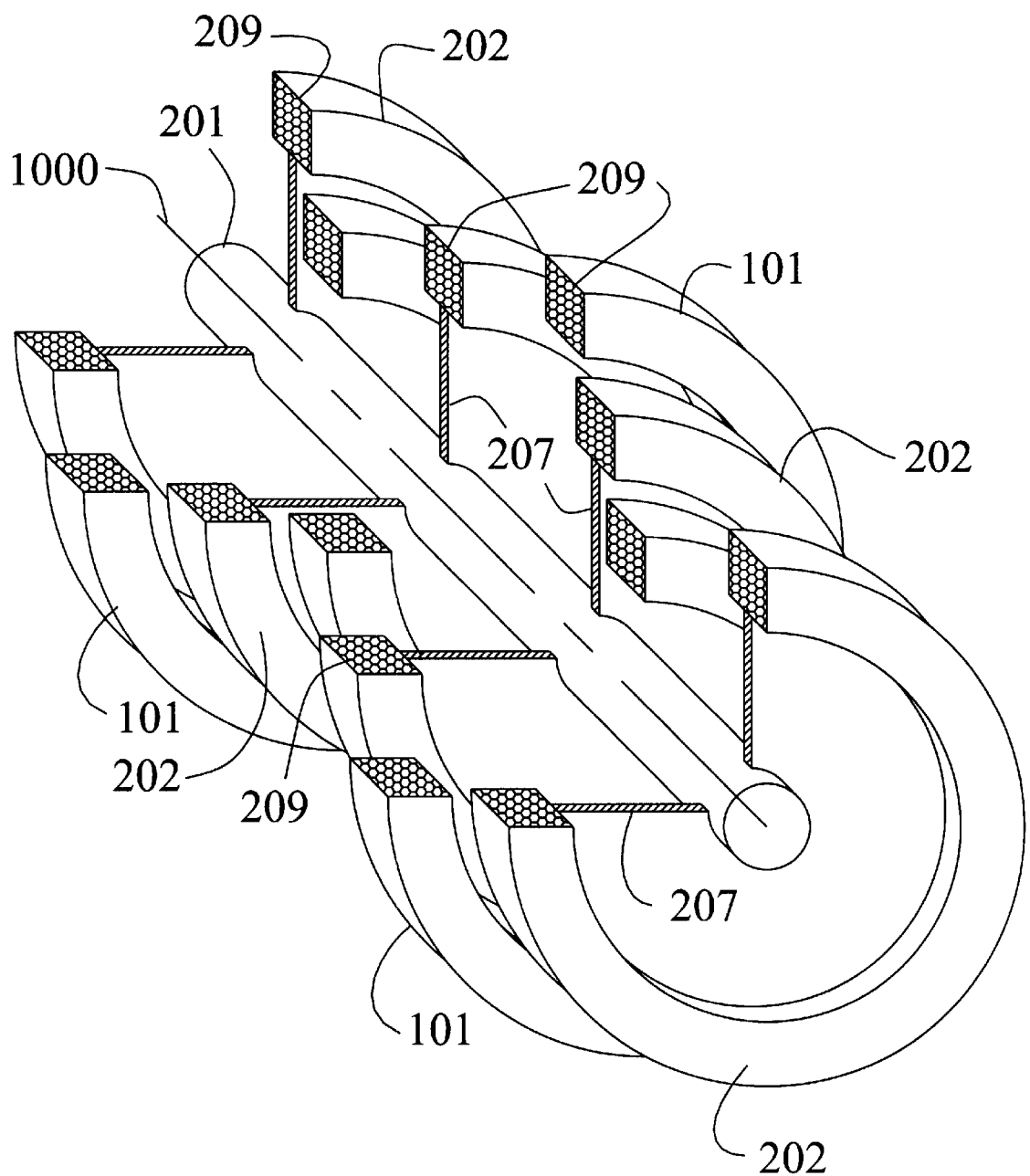
FIG. 9 is a view of still another embodiment of bearing apparatus in accordance with the principles of the invention.

In another embodiment of the invention, FIG. 9, each closed stator loop 101 is an identical coil encased in a rigid member mounted on stator 100 and wound from a thin superconductive niobium-titanium or niobium-tin wire 209 or other superconductive material and equipped with the two-state-switch, FIG. 3. The closed stator loops 101, FIG. 9, are each angular spaced and mounted on the stator between ones of the rotor closed loops 202 so as to be perpendicular to and off-center of the rotor axis 1000. Each closed rotor loop 202 is an identical short-circuited coil wound from a thin niobium-titanium or niobium-tin wire 209 or other super conductive material and encased in a rigid member attached to the rotor 201 by a disk 207 positioned along the rotor axis 1000. In the arrested position of the rotor, the closed rotor loops 202 are concentric to the rotor axis 1000 and are equally axially spaced relative to adjacent closed stator loops 101. The operating conditions for this bearing apparatus are similar to the preferable embodiment of FIG. 1. In operation, frozen magnetic linkages are established between adjacent closed stator and rotor loops 101 and 202 thereby supporting a rotation of the rotor 201 in an equilibrium stable and free state within the stator 100.

Figure 10:
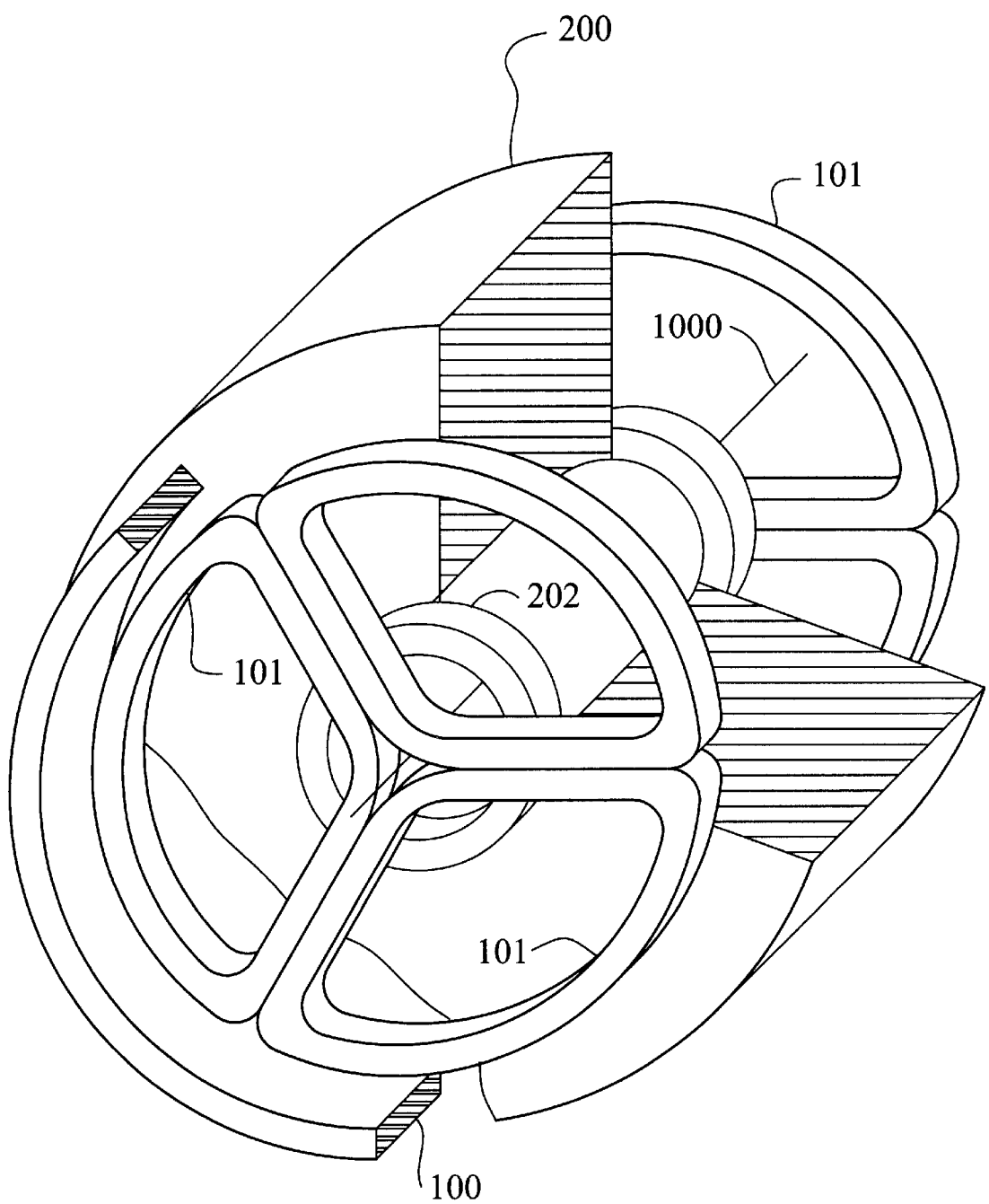
FIG. 10 is a view of yet another embodiment of bearing apparatus in accordance with the principles of the invention.

In yet another embodiment, superconductive bearing apparatus, in accordance with the principles of the invention, has a pair of superconductive magnetic bearings, FIG. 10. Each superconductive magnetic bearing is composed of three planer closed stator loops 101 adjacent one closed rotor loop 202 and may be used with a kinetic energy carrier for flywheel energy storage. The stator 100 comprises a pair of planar closed stator loops each having three coils wound of superconductive thin niobium-titanium or niobium-tin wire or formed of other superconductive material and each coil angularly spaced adjacent to another one of the coils and each of three closed stator loops 101 mounted at an end of the stator 100 in a plane parallel to a corresponding one of the closed rotor loops 202 and each equipped with a two-state-switch, FIG. 3. Each closed stator loop 101, FIG. 10, is formed in a circular arc and two radial segments connected by smooth curves configuration and are equally angularly spaced in their plane and from rotor axis 1000. Closed rotor loops 202 are a ring configured superconductive short-circuited coil wound from superconductor wire and encased in a rigid member mounted in a plane perpendicular to the rotor axis 1000 on ends of the rotor 200 adjacent to three of the closed stator loops 101. The procedures for preparing this apparatus for operation are similar to above set forth procedures for the embodiment shown in FIG. 1. In operation, frozen magnetic linkages are established between the three adjacent closed stator loops 101 and a closed rotor loop 202 thereby supporting a rotation of the rotor 200 in an equilibrium stable free state within the stator 100.

Closed loops as sources of magnetic fields can be represented in various design configurations. A pair of closed stator and rotor loops for use with a superconductive bearing rotor and stator shown in FIG. 11 may be fabricated from a wide range of superconductor material. Generally they form concentric rigid thin current carrying rings 500. Rings 500 are formed in a three-layered plate wherein they are mounted in a heat sink 501 secured to a resistive heater 502 and attached to a backing 503. In another design, FIG. 12, a current carrying configuration is formed of a plurality of closed stator loops 500 each formed of a superconductive material configured to have two non-equal circular-arc sides joined at the ends thereof by radial segments and having zero electrical resistance at a temperature below a superconductivity transition temperature. Closed loops 500 are mounted in a circular configuration in a heat sink 501 which is secured on a resistive heater 502 attached to a backing 503 to form a closed loop network.

FIG. 13 illustrates another concept for the fabrication of closed loops. A thin layer of a resistive heater 502 is deposited on a flat backing 503. Next, a first heat sink 501, a thin layer of a good heat conductor like copper, is deposited on the resistive heater 502. Then a thin film of a semiconductor material such as a niobium-tin is deposited on the flat surface of heat sink 501 which is then etched to form a pattern of closed current carrying loops 500 as pluralities of individual closed curves and/or a rigid network with meshes of small width loops. After depositing the first layer of loops 500, a second heat sink layer 504 is deposited so that it fills all open areas and covers loops 500 providing a flat surface before next depositing the second layer of closed loops 500. Then a third heat sink layer 504 is deposited similarly to the second one. The layer sequence is repeated to form a "sandwich" of current carrying closed loops of identical or unlike loops and with loop coincidence or not for neighboring layers of closed loops.

Figure 14:
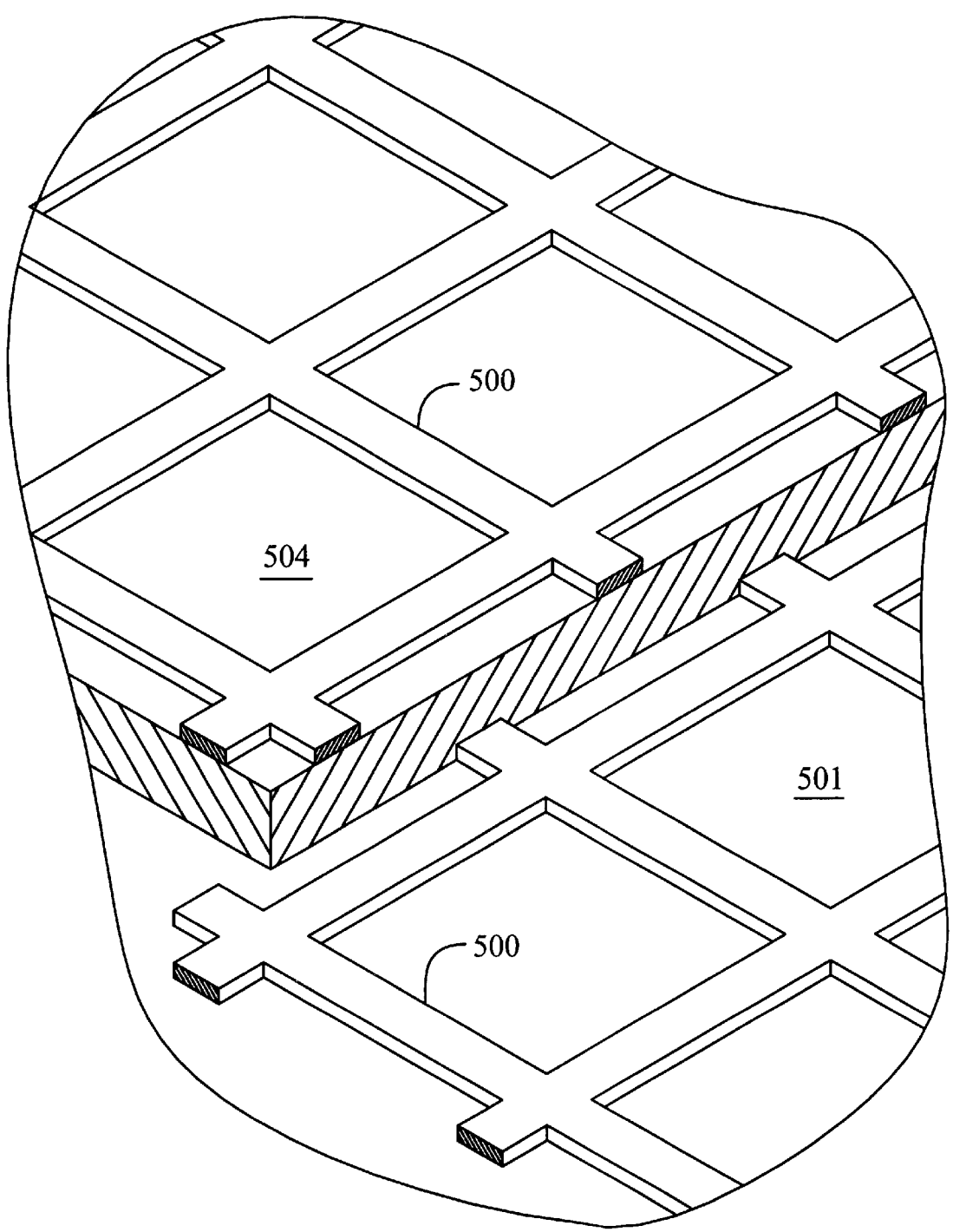

In any version of thin film technology, a closed loop 500 intended for mounting on a stator or rotor can be fabricated to include a current carrier, resistive heaters as two-state-switches, and with heat sinks. In one exemplary example, FIG. 14, a plurality of closed loops 500, each formed of a superconductive material configured in a square configuration and having zero electrical resistance at a temperature below a superconductivity transition temperature, are formed as a "sandwich" of two webs of closed loops 500 having a square shape positioned in a mesh. First ones of the closed loops 500 are mounted as a square mesh on an upper surface of a first heat sink 504 and second ones of the closed loops 500 are mounted as a square mesh on an upper surface of a second heat sink 501 and mounted such that the second closed loops 500 are positioned adjacent a lower surface of the first heat sink 504 to correspond with the first closed loops 500.

Figure 15:
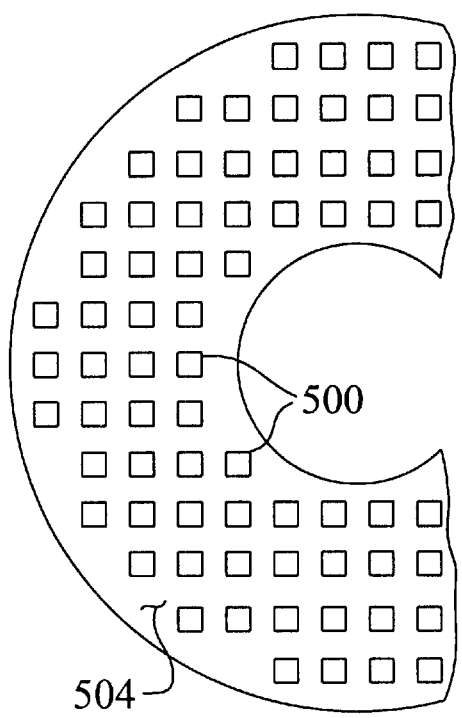
Figure 16:
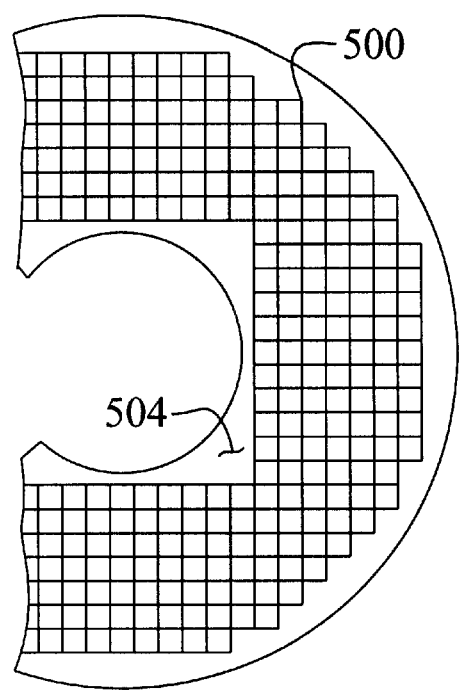

Individual square multiple closed loops 500, FIG. 15, can be placed on heat sink 504 and configured in a micron size for typical micron superconductive bearing applications. The same scaling convention, FIGS. 16 and 17 may be used to form meshes of square and ring configured closed loops 500 of thin super conductive current carriers deposited on heat sinks 504.

Figure 18:
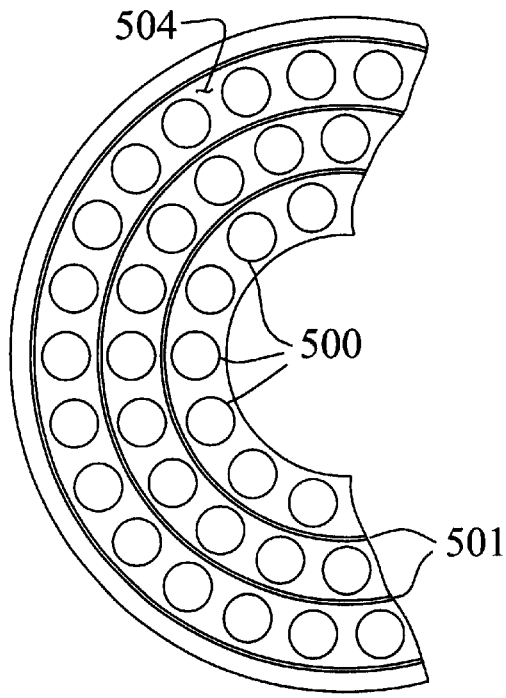
Figure 17:
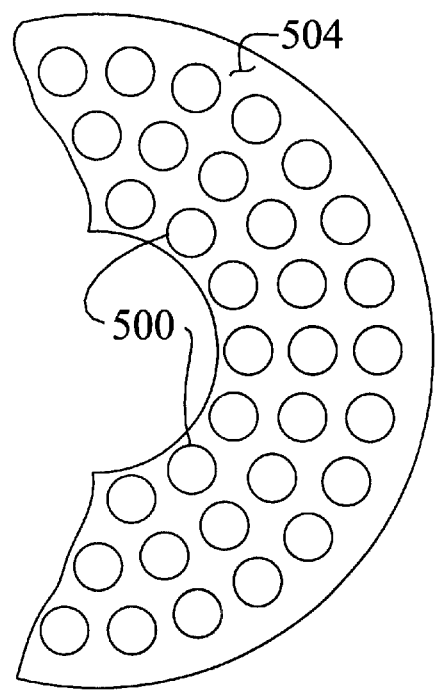
Figure 19:
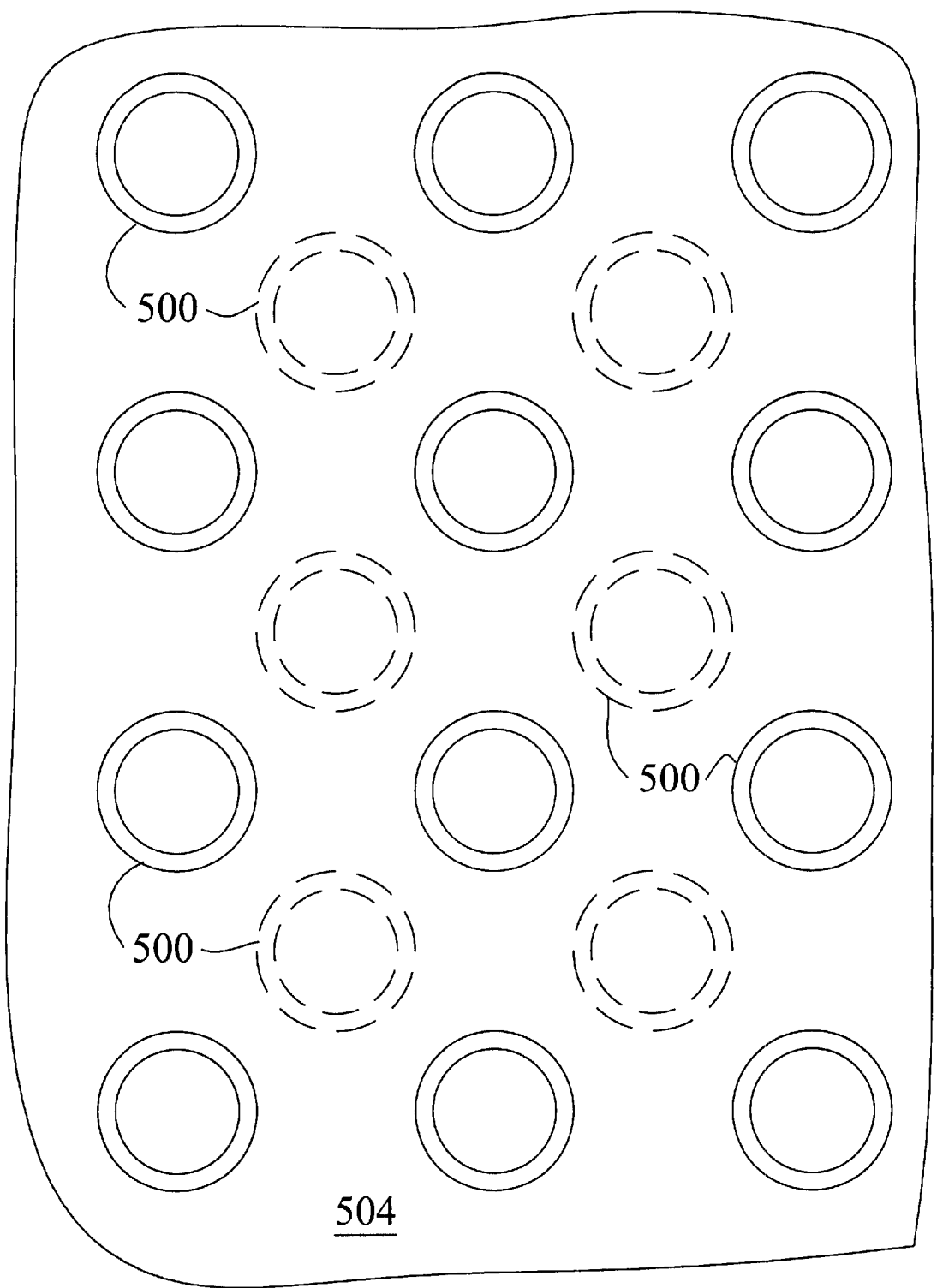

FIG. 17 shows a design of individual ring current carriers 500 deposited on heat sink 504. Small sizes of closed loops in FIGS. 15 through 17 promote the high rigidity of the magnetic bearing because rigidity is inversely proportional to sizes of current carriers. FIG. 18 shows large concentric closed rings 501 and small closed rings 500 between the large closed rings 501. Large concentric rings 501 configured as closed loops are responsible for providing large magnetic forces and small rings 500 are beneficial in providing high rigidity of a magnetic bearing. FIG. 19 illustrates two neighboring layers 504 of closed loops 500 which overlap one another. Similar geometric configurations increases rigidity of superconductivity magnetic bearings due to overlapping of closed loops in layers of coils. The closed loop configurations set forth in FIGS. 15 through 19 may be utilized for the stator and rotor of superconductivity magnetic bearings.

A variety of sizes, forms and displacements of super conductive short-circuited loops can be used for the stator and rotor to provide specific magnetic force interaction in magnetic bearings. The closed loops geometry can satisfy high load requirements by special mutual displacements of magnetically interacting closed loops mounted on the stator and rotor. At the same time these mutual displacements must provide for the required properties of stable positioning and zero torque respective to the axis of the stator only. In other respects they can be arbitrary. Therefore, typical concentric mutual displacement is not necessary. The invention proposes two types of the non-concentricity. In one case the non-concentricity is between axes of the stator and the magnetic field of the closed stator loops and in the second case between the axes of the stator and magnetic fields of the closed rotor loops. The non-concentricity loop arrangement provides for non-zero radial derivative of mutual inductance responsible for high rigidity. The invention also proposes special force regimes for magnetic forces in the superconductivity magnetic bearings in order to stretch or press the free rotor in axial and radial directions. These regimes may be utilized to establish conditions for providing for maximal rigidity of a superconductivity magnetic bearing.

Additional advantages may be achieved by adjustments of locations of the free rotor while it is in equilibrium and rotating to guarantee reliable performance over a range of speeds. Using magnetic field sensors, 300, FIG. 1, and a measuring subsystem, of a type well known and which needs not be shown for an understanding of the invention, can fulfill this adjustment. The sensors 300 are mounted on the stator and positioned in zones of the closed stator loop magnetic fields so that radial shifts of the rotor and angular declinations of the rotor axis are in functional relations with the sensors data in a one-to-one correspondence. As an example, the sensors 300 are located so that their axes of sensitivities are parallel to the stator axis and the rotor center of mass is between parallel planes containing the sensors 300. The number of sensors 300 positioned in each plane is three or more. Sensor data on the magnetic field parameters in each plane indicate the maximal radial rotor shifts in this plane. Data from sensors 300 in two planes are processed through the measuring subsystem to provide the means for accurate determination of radial shifts of the rotor center of mass and angular declinations.

While the foregoing detailed description has described several embodiments of superconductive bearing apparatus in accordance with this invention, it is to be understood that the above description is merely illustrative and does not limit the scope of the claimed invention. Particularly, the disclosed superconductive bearing apparatus may have various configurations of the stator and rotor in combination with various shapes and configurations of stator and rotor closed loops for establishing magnetic linkages supporting a rotation of the rotor in an equilibrium stable free state within the stator. It is obvious from the foregoing that the facility, economy and efficiency of bearing apparatus may be substantially enhanced by superconductive bearing apparatus for establishing magnetic linkages between closed stator and rotor loops forming a bearing supporting a rotation of the rotor in an equilibrium stable free state within the stator.

What is claimed is:

1. Apparatus for supporting a rotor with respect to a stator comprising rotor closed loops formed of a material having zero electrical resistance at a temperature below a superconductivity transition temperature and which are mounted on each end of the rotor, stator closed loops formed of the zero electrical resistance material and angularly mounted on the stator adjacent each of the closed rotor loops, a cooling agent for cooling the closed rotor and stator closed loops to a temperature below the superconductivity transition temperature, and apparatus for energizing the cooled closed rotor and stator loops and establishing magnetic linkages therebetween forming a bearing supporting a rotation of the rotor in an equilibrium stable free state within the stator.

2. The bearing apparatus set forth in claim 1 further comprising sensors mounted on the stator within a magnetic field zone of the stator closed loops for registering linear shifts and angular declinations of the rotor relative to the stator.

3. The bearing apparatus set forth in claim 2 wherein the rotor closed loops each comprise a planar short-circuited coil wound of a superconductive wire and mounted on an end of a shaft of the rotor.

4. The bearing apparatus set forth in claim 3 wherein the stator closed loops each comprise a planar short-circuited coil wound of the superconductive wire and angularly positioned at ends of the stator around the closed rotor loops.

5. The supporting apparatus set forth in claim 4 wherein ones of said planar coils comprise a two-state switch having a resistive and a short state formed of coils of wire wound around a section of the planar short-circuited coils.

6. The bearing apparatus set forth in claim 2 wherein the closed stator loops each comprise a planar short-circuited coil wound of the superconductive wire configured to have two non-equal circular-arc sides joined at the ends thereof by radial segments.

7. The supporting apparatus set forth in claim 2 wherein the rotor loops each comprise a planar superconductive short-circuited coil wound from thin niobium-titanium wire.

8. The supporting apparatus set forth in claim 2 wherein the rotor loops each comprise a planar superconductive short-circuited coil wound from thin niobium-tin wire.

9. The supporting apparatus set forth in claim 2 wherein the stator loops each comprise a planar superconductive short-circuited coil wound from thin niobium-titanium wire.

10. The supporting apparatus set forth in claim 2 wherein the stator loops each comprise a planar superconductive short-circuited coil wound from thin niobium-tin wire.

11. The bearing apparatus set forth in claim 1 wherein the rotor comprises a plurality of closed rotor loops each wound as a coil of the superconductive wire around the rotor and each positioned in a circular plane about an axis of the rotor.

12. The bearing apparatus set forth in claim 11 wherein the stator comprises a plurality of closed stator loops each wound as a coil of the superconductive wire and ones of which are mounted in the stator in the plane around the rotor adjacent to a corresponding one of the closed rotor loops.

13. The bearing apparatus set forth in claim 1 wherein the rotor comprises a plurality of closed rotor loops each wound as a coil of the superconductive wire around the rotor and each mounted on the rotor shaft in adjacent planes each perpendicular to an axis of the rotor.

14. The bearing apparatus set forth in claim 13 wherein the stator comprises a plurality of closed stator loops each wound as a coil of the superconductive wire and each angular spaced and mounted on the stator adjacent ones of the rotor closed short-circuited loops in the planes perpendicular to the rods of the rotor.

15. The bearing apparatus set forth in claim 1 wherein the rotor comprises a pair of the closed rotor loops each wound as a coil of the superconductive wire and mounted on an end of a shaft of the rotor in a plane perpendicular to an axis of the rotor shaft.

16. The bearing apparatus set forth in claim 15 wherein the stator comprises a pair of the closed stator loops each having three coils wound of the superconductive wire and each coil angularly spaced adjacent to another one of the coils and wherein each closed stator loop is mounted on an end of the stator in a plane parallel to a corresponding one of the closed rotor loops.

17. The supporting apparatus set forth in claim 1 wherein ones of said loops comprise a two-state switch having a resistive and a short state.

18. Bearing apparatus comprising a rotor having a pair of closed rotor loops each formed of a planar short-circuited coil wound of a superconductive wire having zero electrical resistance at a temperature below a superconductivity transition temperature and which are mounted on a shaft of the rotor at each end of the rotor, a stator enclosing the rotor and having closed stator loops formed as planar short-circuited coils wound of the superconductive wire configured to have two non-equal circular-arc sides joined at the ends thereof by radial segments and each angularly positioned at ends of the stator around the closed rotor loops, a cooling agent for cooling the closed rotor and stator closed loops to a temperature below the superconductivity transition temperature, apparatus for energizing the cooled closed rotor and stator loops and establishing magnetic linkages therebetween forming a bearing supporting a rotation of the rotor in an equilibrium stable state within the stator, and sensors mounted on the stator within a magnetic field zone of the closed stator loops and rotor loops magnetic linkages for registering linear shifts and angular declinations of the rotor relative to the stator.

19. Apparatus for supporting a rotor with respect to a stator comprising a plurality of closed rotor short-circuited loops formed of a material having zero electrical resistance at a temperature below a superconductivity transition temperature and each of which are wound as a coil of wire around the rotor and positioned along the rotor in circular planes perpendicular about an axis of the rotor, a plurality of closed stator loops each wound as a coil of the superconductive wire and each mounted on the stator and each angularly positioned in the planes round the rotor adjacent to a corresponding one of the closed rotor short-circuited loops, a cooling agent for cooling the closed rotor and stator loops to a temperature below the superconductivity transition temperature, and apparatus for energizing the cooled closed rotor and stable loops and establishing magnetic linkages therebetween forming a bearing supporting a rotation of the rotor in a stable equilibrium free state within the stator.

20. Apparatus for supporting a rotor with respect to a stator comprising a pair of closed rotor short-circuited loops each wound as a coil of superconductive wire having zero electrical resistance at a temperature below a superconductivity transition temperature and each mounted on an end of a shaft of the rotor in a plane perpendicular to an axis of the rotor, a pair of planar stator members each having three coils wound of the superconductive wire and each coil angularly spaced adjacent to another one of the coils and wherein the three closed stator coils are mounted on an end of the stator in a plane parallel to and adjacent to a corresponding one of the closed rotor loops, a cooling agent for cooling the closed rotor and stator closed loops to a temperature below the superconductivity transition temperature, and apparatus for energizing the cooled closed rotor and stator loops and establishing magnetic linkages therebetween forming a bearing supporting a rotation of the rotor in a stable equilibrium free state within the stator.

* * * * *